April 3, 1962 S. TUCKER 3,028,331
HYDROGEN PRODUCTION IN A TCC PROCESS
Filed April 7, 1959 4 Sheets-Sheet 1

INVENTOR.
Stanley Tucker
by Charles A. Huggett
ATTORNEY.

April 3, 1962   S. TUCKER   3,028,331
HYDROGEN PRODUCTION IN A TCC PROCESS
Filed April 7, 1959   4 Sheets-Sheet 3

INVENTOR.
Stanley Tucker
by Charles A. Huggett
ATTORNEY

April 3, 1962  S. TUCKER  3,028,331
HYDROGEN PRODUCTION IN A TCC PROCESS
Filed April 7, 1959  4 Sheets-Sheet 4

INVENTOR.
Stanley Tucker
ATTORNEY 3,028,331
HYDROGEN PRODUCTION IN A TCC PROCESS
Stanley Tucker, Collingdale, Pa., assignor to Socony
Mobil Oil Company, Inc., a corporation of New York
Filed Apr. 7, 1959, Ser. No. 804,738
6 Claims. (Cl. 208—124)

This invention relates to the production of hydrogen and particularly relates to the operation of a moving bed hydrocarbon conversion process to produce in addition to the usual conversion products an excess of hydrogen for use in related hydrogen-deficient processes.

In the manufacture of gasoline, fuel oil and other related products from petroleum, a multitude of conversion processes are used to provide the desired components. These processes include desulfurization, hydrodesulfurization, catalytic and thermal cracking, reforming, hydrocracking and others. The moving bed process for producing gasoline and fuel oil has been used extensively and has found favorable acceptance. In this process a gravitating bed of granular or bead catalyst is gravitated as a compact bed through reaction and reconditioning zones in an enclosed cyclic path. The hydrocarbons in the form of vapor or liquid are charged to the catalyst bed in the reaction zone and pass through the void spaces in the bed. The hydrocarbons are cracked producing a substantial amount of useful products from the heavy oil charge stock. The gasoline produced has been found exceedingly useful as motor fuel, having a high antiknock rating.

Recent improvements in automotive engines have made it necessary to continually improve the fuel and hence reformers have been adopted by most refineries as a means of upgrading the fuel. The gasoline from TCC, thermal cracking or other means is passed through the reformers to effectively upgrade the fuel to a higher octane. The most common reforming systems involve the use of a silica and/or alumina base catalyst with a small percentage of paltinum or palladium. The catalyst is usually contained in fixed beds and the gasoline is passed in vapor form through the catalyst bed. The reforming process generally provides an excess of hydrogen which can be recycled for use in the process and delivered to other processes deficient in hydrogen.

The use of charge stocks high in sulfur and various metals has a damaging effect on the reforming catalyst, causing the catalyst to rapidly lose its activity as a reforming catalyst. The gasoline vapors are therefore passed through a desulfurizing step prior to introduction into the reformer. The most favorable process involves the passage of the vapors through a fixed bed of cobalt molybdate catalyst in combination with a stream of hydrogen or hydrogen-containing gas. The sulfur is converted to hydrogen sulfide which can be released from the product stream. While hydrogen is separated and recycled, the process consumes hydrogen and hence a substantial amount of fresh hydrogen must be supplied with the charge stock. While this hydrogen may be supplied by the reformer, frequently the reformer will not supply sufficient hydrogen and hence an additional amount must be provided. The provision of a continuous supply of a substantial amount of hydrogen to the desulfurizer is expensive, placing a heavy burden on the final product price.

Recent automotive engine designs have been found exceedingly sensitive. Fuels having equal antiknock rating have been found to exhibit different behavior in different engines. The blending of fuels has become a highly critical factor in assuring customer satisfaction. The TCC or catalytically cracked gasoline must be blended with natural gasoline and thermal gasoline and reformed to provide a balanced product capable of meeting the requirement of all engines.

Various hydrocracking processes have been developed recently wherein the hydrocarbons mixed with hydrogen are passed over a fixed bed of catalyst under conditions arranged to favor cracking. This process, like the hydrodesulfurization process, is deficient in hydrogen. Hydrocracking frequently requires extensive amounts of hydrogen and the process has many times been rejected because of the inability to provide economically the large amount of hydrogen required. The hydrocracking process provides a gasoline having somewhat different characteristics from the TCC process and frequently a blend of these gasolines is found superior to either gasoline separately. It is therefore desirable to have both a hydrocracking and TCC process operating in each refinery.

The very early petroleum market was primarily as a lamp fuel, and hence kerosene was the primary product, with gasoline being a waste product. With the growth of the automobile business, the gasoline naturally present in petroleum was soon found insufficient to meet the demand without wasting substantial amounts of petroleum. This situation was met by cracking in which a substantial portion of the heavier oil is converted to gasoline. Recently, however, in some locations there has been produced an excess of gasoline. Demand for fuel oil has increased as more homes have converted to oil heat, more factories have turned to oil as a source of power and railroads have virtually changed over completely from steam to diesel oil. A means of increasing or maintaining the heating oil production without producing excess gasoline has been sought to correct this imbalance.

The object of this invention is to provide a method of operating a moving bed conversion system to produce a required amount of hydrogen for hydrogen-deficient processes.

A further object of this invention is to operate a moving bed hydrocarbon conversion system to provide that amount of hydrogen required to maintain the related conversion process in hydrogen balance.

A further object of this invention is to provide a method of operating a moving bed hydrocarbon conversion process so as to limit gasoline production while maintaining high fuel oil production and so as to provide that amount of hydrogen required to make up the deficiency of hydrogen in hydrogen-deficient processes, such as the hydrodesulfurization and/or hydrocracking processes whereby external hydrogen addition is not required.

These and other objects of the invention will be explained in the following detailed description of the invention and the attached drawings.

In one important aspect the invention involves using a moving bed catalyst having a very high concentration of nickel (such as about 400–4000 parts per million) and adjusting the nickel content on the catalyst so as to produce with the usual products of cracking hydrocarbons a substantial amount of hydrogen gas in an amount sufficient to meet the needs of concurrently operating processes, such as hydrodesulfurization and hydrocracking processes.

Figure 1:
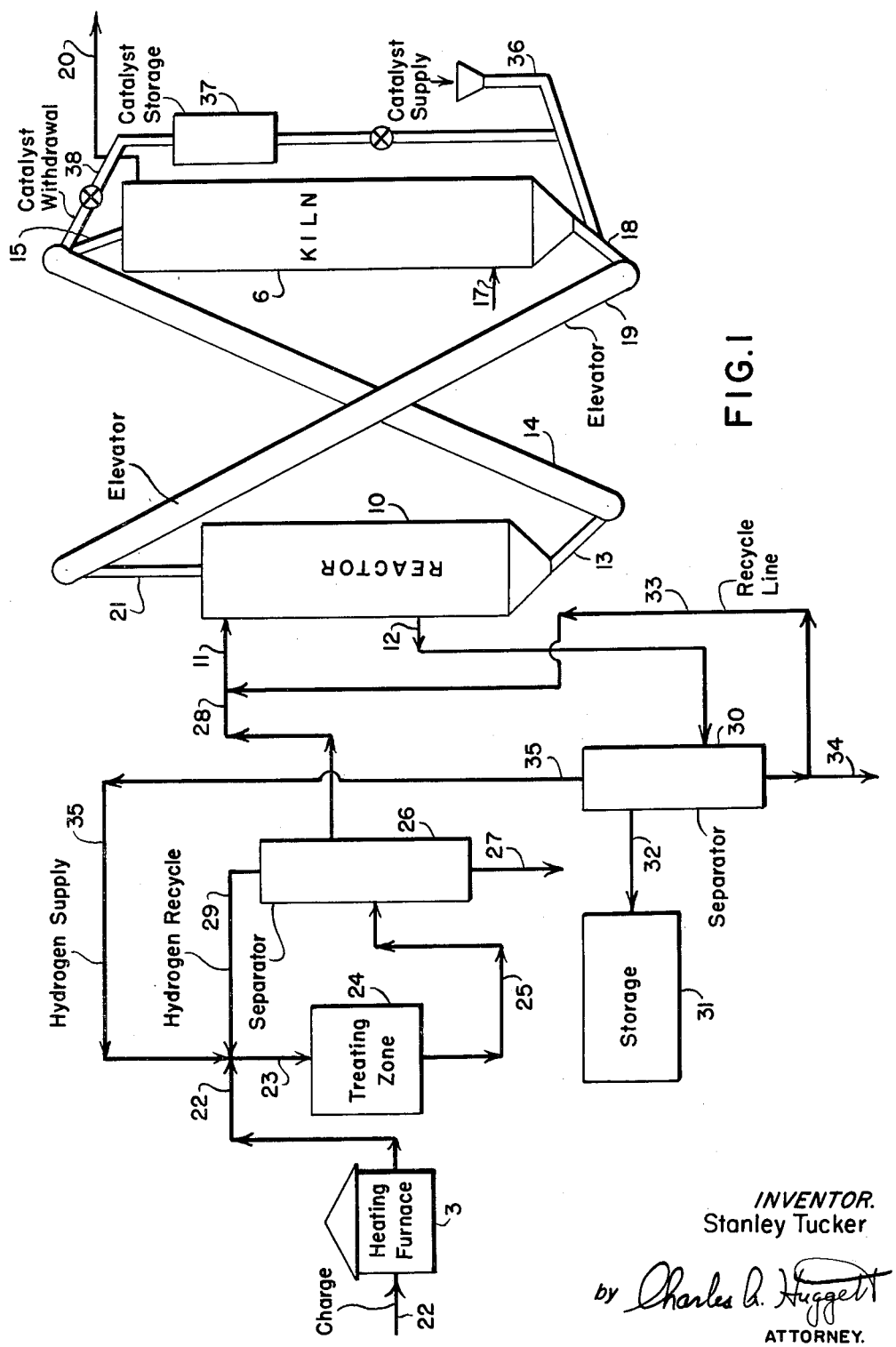
FIGURE 1 shows diagrammatically a hydrotreating process through which a charge stock is passed and moving bed cracking process through which the treated charge is passed to produce improved products.

Referring now to FIGURE 1, the invention will be disclosed in detail. A moving bed cracking catalyst, such as silica-alumina beads, is gravitated as a compact mass through the reactor 10. The hydrocarbon charge properly prepared for reaction is introduced into the gravitating catalyst bed through the conduit 11. The vapors pass through the voids in the gravitating catalyst bed and converted products are withdrawn through the conduit 12. The reactor is maintained at about 10-15 p.s.i.g. and a temperature of about 800-1100° F. During reaction a coke contaminant is deposited on the catalyst and within the pores of the catalyst. The spent catalyst is withdrawn from the bottom of the reactor and gravitated through the conduit 13 to the elevator 14. The catalyst is elevated in the bucket elevator 14 to a level above the kiln 6 and introduced into the kiln 6 through the conduit 15.

The catalyst is gravitated as a compact mass through the kiln 6 and air introduced into the kiln 6 through the conduit 17 is transferred through the voids of the gravitating bed to burn the contaminant coke and elevate the catalyst temperature. The cracking activity of the catalyst is substantially restored by this treatment and the regenerated catalyst is gravitated through the conduit 18 to the return elevator 19. The flue gas formed by the combustion is discharged from the kiln 6 through the conduit 20. The kiln is maintained at about 1000-1400° F. and at about atmospheric pressure. The regenerated catalyst is dropped continuously from the top of the bucket elevator 19 through the conduit 21 into the reactor 10.

As heavier and less desirable charge stocks have been used, the catalyst has become contaminated by metals contained in the hydrocarbon charge. These metals, such as nickel, vanadium, copper and iron, tend to increase coke lay-down, gas formation and decrease gasoline yield. Since they are not removed in the normal regeneration treatment, they tend to build up with time. It has been customary in the past to consider catalyst having 100-150 parts per million nickel as being poisoned catalyst in need of replacement. Efforts have been made to keep the nickel content on the catalyst below 100 p.p.m., nickel being considered the worst offender.

I discovered that, contrary to former belief, the light hydrocarbon ($C_1$-$C_3$) content of the total gas production did not increase when the nickel content was increased above the limiting 150 p.p.m. but that above this level the gas tended to remain constant. I noted, however, that between 400 and about 4000 p.p.m. nickel content on the catalyst, the hydrogen content of the gas became substantial and increased proportionally with increasing nickel content. Hence, the hydrogen purity of the substantially fixed volume of gas produced, increased with increasing nickel content on the catalyst. As the nickel content on the catalyst is increased in the range 400-4000 p.p.m., I found that the conversion remained substantially constant and that the coke lay-down increased while the gasoline yield diminished. Recent catalyst improvements have made it possible to burn vastly increased amounts of coke on catalyst in TCC systems formerly limited at much lower coke levels by temperature limitations. This improved catalyst substantially eliminates the problem of increased coke lay-down. The high nickel content on the catalyst (400-4000 p.p.m.) gives the catalyst dehydrogenation activity and the increased aromatics and olefin volumes produced during the cracking reaction provide an improved product. It is seen, therefore, that while the volume of gasoline produced is diminished, this is offset to substantial extent by the quality improvement obtained in the product.

Charging high-sulfur stocks heavy in nitrogen content to TCC units has produced deleterious effects upon the catalyst. It is desirable to pretreat these stocks before charging them to a TCC unit. Unfortunately, the treating for sulfur removal and nitrogen reduction requires large amounts of expensive hydrogen. It is uneconomical to buy hydrogen for this treatment. By the method of this invention, this pretreatment can be obtained economically by adjustment of the TCC operation to supply the needed hydrogen. Referring to FIGURE 1, the high-sulfur charge stock is passed within conduit 22 through heating furnace 3 and the vaporized charge is passed through a fixed bed of pretreating catalyst such as platinum-impregnated silica or silica-alumina or cobalt molybdate by means of the conduit 23 at the top of the hydrotreater 24. The temperature and pressure of the gas in the hydrotreater is controlled to provide the desired sulfur and nitrogen reduction. The treated product is passed through the conduit 25 to the separator 26. The heavy ends are removed from the bottom of the separator 26 through the conduit 27 to storage or recycle as desired. The treated charge is passed through the conduit 28 into the reactor 10. Hydrogen rich gas is taken overhead from the separator through conduit 29 as recycle for the hydrotreater. Additional hydrogen is required to maintain proper hydrogen balance in the hydrotreater.

The silica-alumina cracking catalyst in the TCC process is maintained at a nickel content between 400 and 4000 p.p.m. by metals in the charge or by the addition to the TCC system of nickel-impregnated catalyst as desired. By these expedients a fairly rapid shift of nickel content on the catalyst can be obtained to adjust the catalyst to any desired value. The product produced in the reactor contains a substantial hydrogen content and the product is separated in the separator. The finished TCC gasoline is taken to storage 31 through the conduit 32. The heavy ends can be recycled through the conduit 33 or removed through the conduit 34. The hydrogen-rich gas stream is taken overhead through the conduit 35 to the hydrotreating zone to meet the hydrogen deficiency of the hydrotreater. As more hydrogen is required for balance, the catalyst is modified to provide that increase in nickel content necessary to provide the added hydrogen required. Catalyst high in nickel content can be added through the conduit 36 with a like amount of catalyst being withdrawn to catalyst storage hopper 37 through the conduit 38. This catalyst can be returned to the system when desired. The catalyst can be impregnated to any desired nickel content by known procedures and the desired nickel content catalyst supplied to the system to produce that amount of hydrogen required to balance the hydrogen-deficient process. The production of excess hydrogen above this requirement is not desired since this results in unnecessary coke burning and decrease of gasoline production. As the hydrogen load varies from time to time, adjustment can readily be made in the TCC system to provide needed correction and maintain balance.

Figure 2:
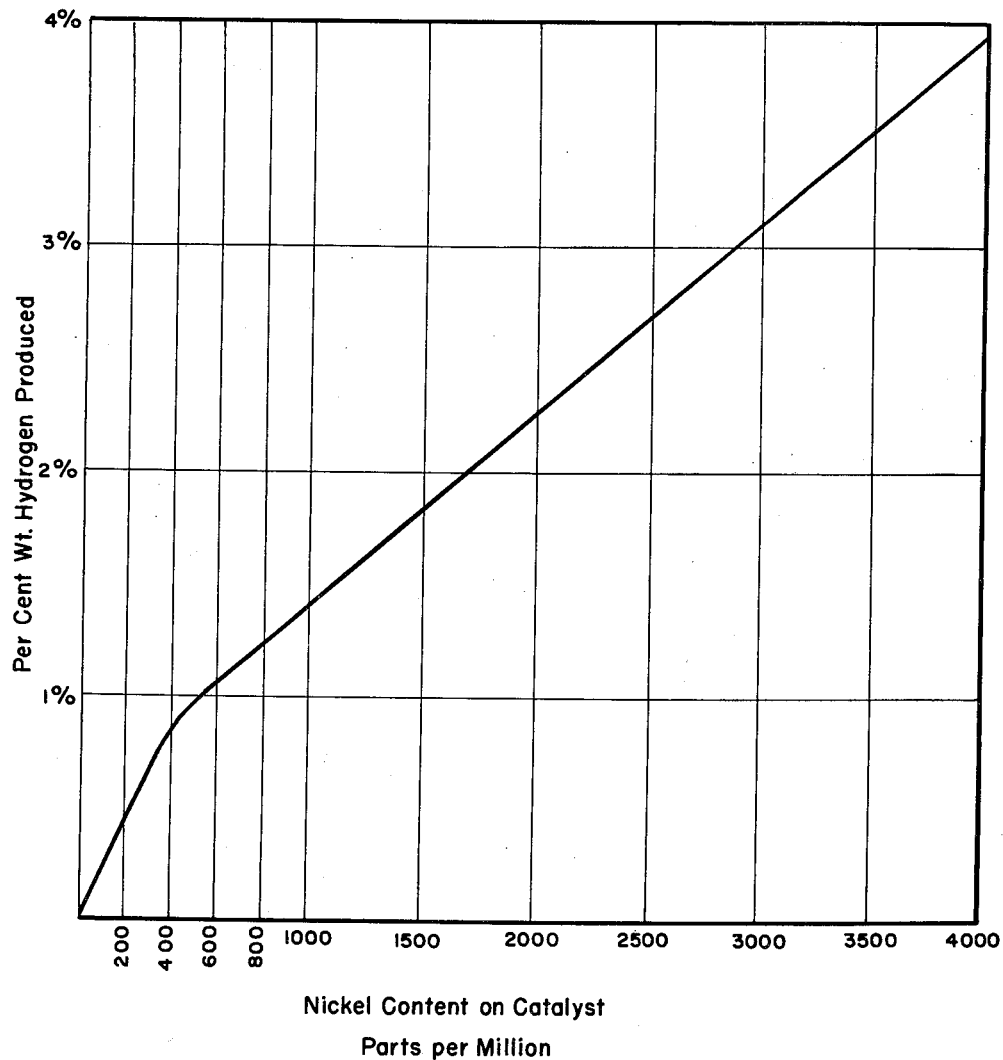
FIGURE 2 shows a curve of nickel content on the catalyst vs. hydrogen production in percent weight of hydrogen for a TCC process.

FIGURE 2 shows a plot of percent weight hydrogen produced in a TCC operation with varying amounts of nickel on a silica-alumina bead type cracking catalyst. As indicated, at about 4000 p.p.m. nickel about 4 wt. percent hydrogen is produced, being a substantial volume of hydrogen for hydrogenation purposes. At a nickel concentration of 2500 p.p.m. the hydrogen yield is about 1500 standard cubic feet per barrel of charge to the TCC. Since an average size TCC unit processes about 15,000 bbl./day of charge, this amounts to a daily production of 9,000,000 cubic feet of hydrogen.

Figure 3:
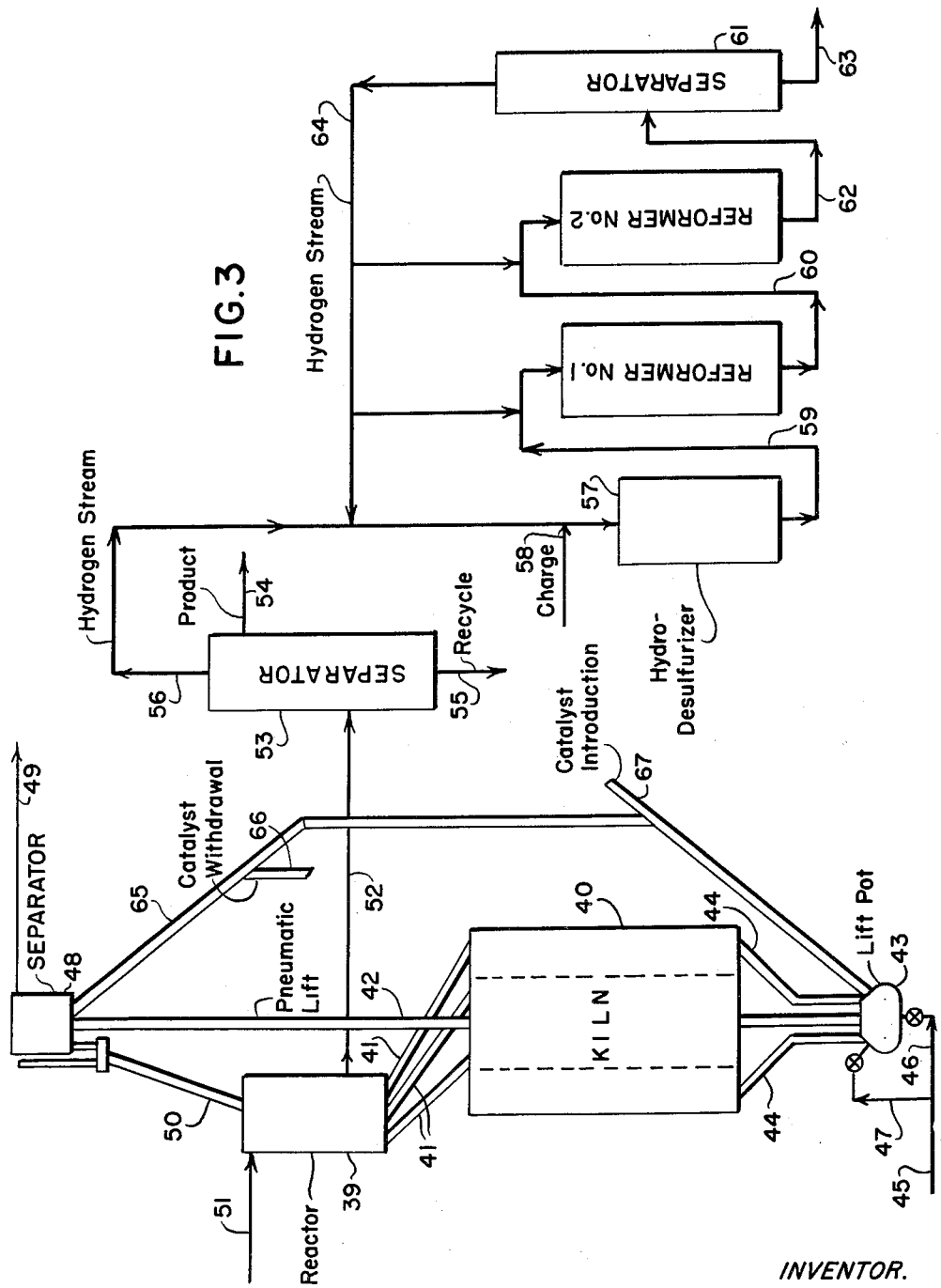
FIGURE 3 shows a diagrammatic arrangement of a TCC process adapted to supply hydrogen to a hydrodesulfurizer to make up hydrogen deficiency in a related desulfurizing-reforming process.

FIGURE 3 shows a modified refinery arrangement involving a pneumatic lift type superimposed TCC system and a two-stage reforming system protected by a hydrodesulfurizing step. In the TCC system the reactor 39 is located above the kiln 40 with connecting catalyst conduits 41 located therebetween. The lift pipe 42 is centrally located within the annular kiln 40 and is used for vertical transfer of the catalyst in a stream of lift gas from the lift pot 43 to the separator 48. The catalyst is gravitated as compact streams from the base of the kiln 40 through conduits 44 to the lift pot 43. A lift gas is passed through conduit 45, split into a primary stream 46 and a secondary stream 47. The primary and secondary streams of gas are controlled to effect elevation of the catalyst through the lift pipe with minimum attrition. The particles and gas are separated in the separator 48, the gas being discharged through the conduit 49 and the solids passed through the gravity feed leg 50 as a compact stream to enter the reactor 39. The reactor may be at about 10 p.s.i.g. pressure and the kiln at about 0 p.s.i.g. The particles can be elevated through the lift by about a 2 p.s.i. differential.

Hydrocarbons prepared for treatment, either in liquid or vapor form, are introduced into the reactor 39 through the conduit 51 and the cracked products and hydrogen are withdrawn through the conduit 52 to a separator 53. The product is removed through the conduit 54. A heavy recycle oil is removed through the conduit 55 at the bottom of the separator 53 and hydrogen-rich gas is taken overhead through conduit 56.

A charge comprising naphtha or naphtha and heavier stocks, is introduced into the hydrodesulfurizer 57 through the conduit 58. The desulfurizer may contain a fixed bed of cobalt molybdate catalyst, and the charge commingled with hydrogen from conduit 56 is passed through the bed under desulfurizing conditions. The desulfurized naphtha is transferred through conduit 59 to reformer No. 1 where the hydrocarbons contact a reforming catalyst, such as silica-alumina impregnated with platinum, under reforming conditions. The reformed hydrocarbons are transferred from reformer No. 1 to reformer No. 2 through the conduit 60 where they are subjected to further reforming treatment. The reformed product is transferred to the separator 61 through the conduit 62, the reformed naphtha being removed from the bottom through the conduit 63 and the hydrogen rich gas removed overhead through the conduit 64.

While the conduit 64 provides some hydrogen for the desulfurizer as well as for the reformers, additional hydrogen from the TCC system is required in varying amounts. When additional hydrogen is required, catalyst is withdrawn from the catalyst recycle stream 65 and the withdrawal conduit 66. The withdrawn catalyst is replaced with catalyst having a higher nickel content through the catalyst introduction conduit 67. Alternatively, greater amounts of metal-containing charge stock can be supplied to the TCC unit to build up the metal concentration on the catalyst to that level required to produce the needed amount of additional hydrogen to balance the systems.

Figure 4:
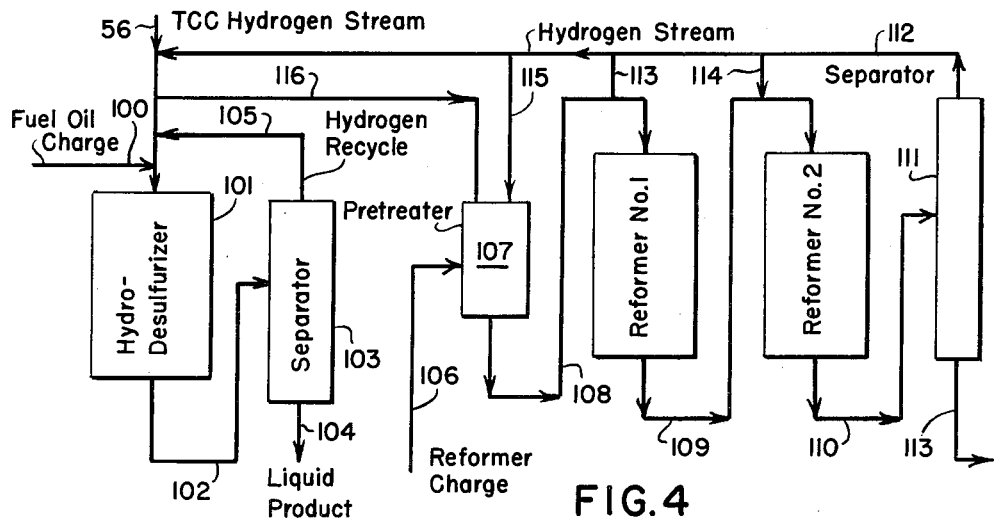
FIGURE 4 shows a diagrammatic arrangement of a TCC and hydrocracking process arranged to transfer from the TCC process to the hydrocracking process the required amount of hydrogen to provide TCC gasoline and hydrocracked gasoline without the need of external hydrogen.

FIGURE 4 discloses a refinery arrangement similar to that shown on FIGURE 3. In this instance, however, a fuel oil charge 100 is passed to a hydrodesulfurizer 101 and the desulfurized product is passed through conduit 102 to separator 103. The liquid product is removed through the conduit 104. The hydrogen recycle is taken overhead through the conduit 105 and returned to the hydrodesulfurizer 101. Similtaneously a reformer charge is passed through conduit 106 into the pretreater 107 for removal or reduction of extraneous undesired materials prior to reforming operations. The treated material is transferred through the conduit 108 to reformer No. 1 and transferred through the conduit 109 to reformer No. 2. The reformed stock is passed through conduit 110 to separator 111. The hydrogen recycle is taken overhead through conduit 112 and the product is withdrawn through the conduit 113. Hydrogen is introduced into reformers 1 and 2 through conduits 113 and 114. Hydrogen is also introduced into the pretreater through conduit 115 and any additional hydrogen may be combined with recycle hydrogen 105 and introduced into the hydrodesulfurizer. Hydrogen deficiency is made up from the TCC system, as previously disclosed, and introduced through the conduit 56. In the event that a hydrogen deficiency develops in the pretreater, the deficiency of both the hydrodesulfurizer and the pretreater can be met by the TCC system through conduit 56 and conduit 116.

Figure 5:
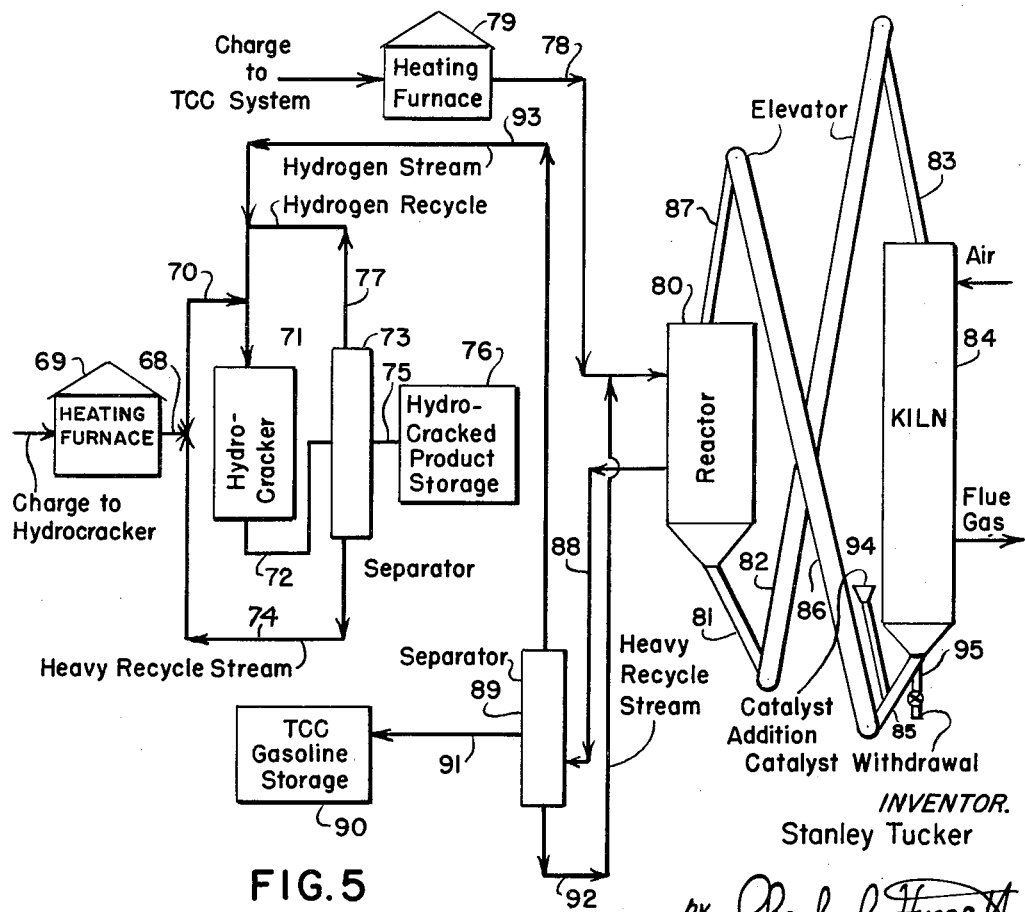

FIGURE 5 discloses the operation of hydrocracking and TCC facilities in a single refinery. The hydrocracking charge is introduced through conduit 68 to a heating furnace 69 and then through conduit 70 to a fixed bed hydrocracker 71. The charge commingled with hydrogen passes through the bed at hydrocracking conditions and the product is transferred through conduit 72 to separator 73. The heavy oil is recycled through conduit 74. The product is transferred through conduit 75 to storage tank 76. The hydrogen-containing stream is recycled overhead through the conduit 77 back to the hydrocracker 71.

The charge to the TCC is passed via conduit 78 through the heating furnace 79 and into the reactor 80. The catalyst is passed from the reactor through conduit 81, elevator 82 and conduit 83 to the kiln 84 where it is revivified. The regenerated catalyst is passed through conduit 85, elevator 86 and conduit 87 to the reactor 80. The cracked product and hydrogen-containing gas is removed from the reactor 80 through the conduit 88 to separator 89. The useful products are passed to storage tank 90 through the conduit 91. The heavy oil is recycled through conduit 92 and the hydrogen stream is passed overhead through conduit 93 to the hydrocracker. Provision for varying the nickel content on the catalyst is provided by means of catalyst addition conduit 94 and catalyst withdrawal conduit 95.

*Example No. 1*

In a TCC style cracking operation a wide range Mid-Continent gas oil was charged to a compact bed catalyst of chromia-silica-alumina beads containing about 400 p.p.m. nickel (32.5 activity index base material). About 0.84 wt. percent hydrogen was produced, providing 489 s.c.f. of hydrogen per bbl. of charge for a companion desulfurizing process. About 33.9 volume percent gasoline was produced and the coke lay-down was 8.5 wt. percent. The conversion was 49.3 percent by volume and the total liquid yield was 93.8 percent by volume. The hydrogen purity in the total dry (including $C_1$–$C_3$ hydrocarbons) was found to be 76 percent. Recovery of $C_2$ and $C_3$ hydrocarbons would yield a gas stream of hydrogen and methane only, containing 92.8 percent hydrogen.

*Example No. 2*

In the TCC style cracking example of Example 1 in order to provide additional hydrogen for both hydrodesulfurization and hydrocracking, the catalyst was modified to increase the nickel content to 2500 p.p.m. A 35.2 activity index base was used and produced 2.68 percent hydrogen by weight amounting to a total of 1560 s.c.f. of hydrogen per bbl. of charge to the TCC unit. The gasoline production was found to be 23.2 percent by volume. The coke produced was 15.9 percent by weight, the conversion being 50.4 percent by volume. The total liquid yield was 80.8 percent by volume. The hydrogen purity in the total dry gas (including $C_1$–$C_3$ hydrocarbons) was found to be 88 percent, an increase of 12 percent in purity over Example 1 on an equivalent basis. Recovery of $C_2$ and $C_3$ hydrocarbons would yield a gas stream of hydrogen and methane only, containing 96.2 percent hydrogen.

It is seen from the examples above that the gasoline production decreases with increasing nickel content. The fuel oil production remains substantially unchanged, being 50.7 percent by volume in Example 1 and 49.6 percent by volume in Example 2. This procedure becomes very attractive in locations such as Europe, therefore, where fuel oil is in demand and gasoline production is excessive. The gasoline produced is found to be of improved quality because of the dehydrogenation activity of the high nickel catalyst, providing an increasingly attractive compensating factor for reduction in volume.

It is interesting to note that as nickel content on the cracking catalyst was increased from about 400 to 2500 p.p.m., the hydrogen produced per barrel increased from 489 s.c.f. to 1560 s.c.f. but the dry gas $C_1$–$C_3$ fraction increased only from 155 to 218 s.c.f. This amounted to a 200 percent increase in hydrogen production but a modest increase of only 33⅓ percent in $C_1$–$C_3$ gas fraction. While silica-alumina has been cited as a suitable TCC catalyst, it is understood that other cracking catalysts are available and can be used in accordance with this invention. Silica-zirconia catalyst is particularly suitable for use as a TCC catalyst since this catalyst produces a high percentage of gasoline and furthermore is highly effective in producing hydrogen when nickel is combined therewith. In hydrogen production this catalyst is more effective than the regular silica-alumina or silica-alumina-chromia catalyst generally accepted commercially as TCC catalyst.

The illustrations given hereinabove are merely for the purpose of aiding in an understanding of the invention and are not intended as limitations of the invention. The only limitations are found in the attached claims.

I claim:

1. In the operation of a moving bed hydrocarbon conversion process in which a granular cracking catalyst supporting nickel is passed as a compact gravitating mass cyclically through reaction and regeneration zones and the catalyst is contacted in the reaction zone with a hydrocarbon charge to crack the charge to more desirable products and provide a variable supply of hydrogen, the improved method of operation which comprises the steps of: maintaining the nickel content on the catalyst between about 400 and 4000 parts per million of nickel, to produce along with the cracked products a substantial volume of hydrogen gas, increasing the nickel content on the catalyst within the range about 400–4000 parts per million in the system in response to a demand for additional hydrogen and reducing the nickel content on the calatlyst within said range in response to a decrease in demand for hydrogen, whereby a variable supply of hydrogen is provided along with the usual cracked hydrocarbon products.

2. Claim 1 further characterized in that the hydrogen produced during the cracking reaction is transferred directly to a hydrogen-deficient process to supply to said process the required hydrogen for operation of the process.

3. Claim 2 further characterized in that the hydrogen-deficient process is a hydrocracking process.

4. Claim 2 further characterized in that the hydrogen-deficient process is a hydrodesulfurization process.

5. Claim 2 further characterized in that the hydrogen-deficient process is a hydrotreating process.

6. A method of concurrently operating a TCC process and a hydrogen-treating process which comprises supplying to the cracking catalyst of the TCC process a high deposition of nickel, whereby hydrogen is produced with the cracked products, separating hydrogen from the cracked products and supplying the hydrogen directly to the treating process, introducing treating stock to the treating process along with the hydrogen, separating hydrogen from the treated products and recycling the separated hydrogen to the treating process for reuse, adjusting the nickel content on the catalyst in the TCC process within the range about 400–4000 parts per million to provide only that amount of hydrogen during cracking to complete the requirement of hydrogen needed in the treating process whereby hydrocarbons are processed in both the TCC process and hydrogen-treating process with a balance being maintained between the hydrogen produced in the TCC process and the hydrogen consumed in the hydrogen treating process.

References Cited in the file of this patent

UNITED STATES PATENTS

| | | |
|---|---|---|
| 2,083,795 | Schiller et al. | June 15, 1937 |
| 2,719,108 | Porter | Sept. 27, 1955 |
| 2,780,584 | Doumani | Feb. 5, 1957 |
| 2,885,352 | Ciapetta et al. | May 5, 1959 |
| 2,899,380 | Lanning | Aug. 11, 1959 |
| 2,903,413 | Folkins et al. | Sept. 8, 1959 |

FOREIGN PATENTS

| | | |
|---|---|---|
| 531,599 | Canada | Oct. 9, 1956 |

OTHER REFERENCES

Fraser: "Nickel as a Catalyst," from the Transactions of the Electrochemical Society, volume LXXI, 1937. (Page 19 relied upon.)